United States Patent
Zhu et al.

(10) Patent No.: US 11,664,857 B2
(45) Date of Patent: May 30, 2023

(54) TECHNIQUES FOR BLOCKAGE SENSOR ASSISTED BEAM MANAGEMENT

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/452,300

(22) Filed: Oct. 26, 2021

(65) Prior Publication Data

US 2022/0131574 A1   Apr. 28, 2022

Related U.S. Application Data

(60) Provisional application No. 63/198,581, filed on Oct. 28, 2020.

(51) Int. Cl.
*H04B 7/06* (2006.01)
*H04B 7/0426* (2017.01)

(52) U.S. Cl.
CPC ........... *H04B 7/043* (2013.01); *H04B 7/0639* (2013.01); *H04B 7/0695* (2013.01)

(58) Field of Classification Search
CPC .... H04B 7/043; H04B 7/0639; H04B 7/0695; H04B 7/0691; H04B 7/0874; H04B 7/088; H04B 7/0404
See application file for complete search history.

(56) References Cited

U.S. PATENT DOCUMENTS

| | | |
|---|---|---|
| 8,406,806 B2 | 3/2013 | Wong |
| 8,532,587 B2 | 9/2013 | Lagnado et al. |
| 9,083,074 B2 | 7/2015 | Ayatollahi et al. |
| 9,179,299 B2 | 11/2015 | Schlub et al. |
| 9,344,174 B2 | 5/2016 | Ngai et al. |
| 9,473,220 B2 | 10/2016 | Dinur et al. |
| 10,932,140 B2 | 2/2021 | Xu et al. |

(Continued)

FOREIGN PATENT DOCUMENTS

| | | |
|---|---|---|
| CN | 104509148 A | 4/2015 |
| TW | 201539865 A | 10/2015 |

(Continued)

OTHER PUBLICATIONS

International Search Report and Written Opinion—PCT/US2021/072056—ISA/EPO—dated Mar. 1, 2022.

*Primary Examiner* — Kenneth T Lam
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may transmit a monitoring signal associated with one or more antennas. The UE may identify, based at least in part on the monitoring signal, a blockage associated with the one or more antennas. The UE may perform a beam search using a decreased frequency of occurrence of tracking occasions for the one or more antennas based at least in part on the identification of the blockage associated with the one or more antennas. Numerous other aspects are provided.

30 Claims, 8 Drawing Sheets

(56) References Cited

U.S. PATENT DOCUMENTS

| | | |
|---|---|---|
| 10,992,355 B2 | 4/2021 | Lee et al. |
| 11,032,718 B2 | 6/2021 | Malik et al. |
| 2009/0115657 A1 | 5/2009 | Cheng et al. |
| 2013/0040682 A1 | 2/2013 | Chang et al. |
| 2015/0195026 A1* | 7/2015 | Sagong ............... H04B 7/0695 375/267 |
| 2015/0349863 A1* | 12/2015 | Elayach ............... H04B 7/0404 375/295 |
| 2015/0351135 A1 | 12/2015 | Schmidt et al. |
| 2016/0014566 A1 | 1/2016 | Bengtsson et al. |
| 2016/0044463 A1 | 2/2016 | Lee |
| 2016/0044517 A1 | 2/2016 | Raghavan et al. |
| 2016/0094939 A1 | 3/2016 | Guy et al. |
| 2016/0198474 A1 | 7/2016 | Raghavan et al. |
| 2016/0323898 A1 | 11/2016 | Jo et al. |
| 2016/0329943 A1 | 11/2016 | Selén et al. |
| 2016/0365886 A1 | 12/2016 | Prendergast et al. |
| 2018/0109303 A1 | 4/2018 | Yoo et al. |
| 2018/0191422 A1 | 7/2018 | Xia et al. |
| 2019/0074879 A1 | 3/2019 | Furuskog et al. |
| 2019/0115657 A1 | 4/2019 | Hwang et al. |
| 2019/0393944 A1* | 12/2019 | Huang ............... H04B 7/0639 |
| 2020/0076488 A1* | 3/2020 | Brunel ............... H04B 7/063 |
| 2021/0258064 A1 | 8/2021 | Yu et al. |
| 2021/0266050 A1 | 8/2021 | Sahoo et al. |

FOREIGN PATENT DOCUMENTS

| | | |
|---|---|---|
| WO | 2015183472 A1 | 12/2015 |
| WO | WO-2016003624 A1 | 1/2016 |
| WO | 2016180497 A1 | 11/2016 |
| WO | 2020214168 A1 | 10/2020 |

\* cited by examiner

TECHNIQUES FOR BLOCKAGE SENSOR ASSISTED BEAM MANAGEMENT

CROSS-REFERENCE TO RELATED APPLICATION

This Patent Application claims priority to U.S. Provisional Patent Application No. 63/198,581, filed on Oct. 28, 2020, entitled "TECHNIQUES FOR BLOCKAGE SENSOR ASSISTED BEAM MANAGEMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for blockage sensor assisted beam management.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes monitoring one or more antennas; identifying a blockage associated with the one or more antennas based at least in part on the monitoring of the one or more antennas and based at least in part on a monitoring signal transmitted using the one or more antennas; and performing a beam search based at least in part on the identification of the blockage associated with the one or more antennas.

In some aspects, the performance of the beam search is to identify a serving beam for the UE.

In some aspects, the performance of the beam search based at least in part on the identification of the blockage associated with the one or more antennas further comprises reducing one or more weights associated with the one or more antennas for the beam search.

In some aspects, the one or more weights indicate a number of tracking opportunities for the one or more antennas in the beam search.

In some aspects, performance of the beam search based at least in part on the identification of the blockage associated with the one or more antennas further comprises skipping one or more tracking opportunities associated with the one or more antennas based at least in part on the blockage.

In some aspects, no beam measurement is performed by the UE in the one or more tracking opportunities based at least in part on skipping the one or more tracking opportunities.

In some aspects, the skipping of the one or more tracking opportunities comprises performing a beam measurement associated with a different antenna than the one or more antennas in the one or more tracking opportunities.

In some aspects, the skipping of the one or more tracking opportunities comprises delaying a beam measurement associated with the one or more antennas in the one or more tracking opportunities.

In some aspects, the identification of the blockage is based at least in part on a signal from a blockage sensor of the UE.

In some aspects, the performance of the beam search is based at least in part on the UE being associated with a connected-mode discontinuous reception cycle.

In some aspects, a UE for wireless communication includes a memory and one or more processors coupled to the memory, the one or more processors configured to: monitor one or more antennas; identify a blockage associated with the one or more antennas based at least in part on the monitoring of the one or more antennas and based at least in part on a monitoring signal transmitted using the one or more antennas; and perform a beam search based at least in part on the identification of the blockage associated with the one or more antennas.

In some aspects, the performance of the beam search is to identify a serving beam for the UE.

In some aspects, the one or more processors, when performing the beam search based at least in part on the identification of the blockage associated with the one or more antennas, are configured to reduce one or more weights associated with the one or more antennas for the beam search.

In some aspects, the one or more weights indicate a number of tracking opportunities for the one or more antennas in the beam search.

In some aspects, the one or more processors, when performing the beam search based at least in part on the identification of the blockage associated with the one or more antennas, are configured to skip one or more tracking opportunities associated with the one or more antennas based at least in part on the blockage.

In some aspects, no beam measurement is performed by the UE in the one or more tracking opportunities based at least in part on skipping the one or more tracking opportunities.

In some aspects, the one or more processors, when skipping of the one or more tracking opportunities, are configured to perform a beam measurement associated with a different antenna than the one or more antennas in the one or more tracking opportunities.

In some aspects, the one or more processors, when skipping of the one or more tracking opportunities, are configured to delay a beam measurement associated with the one or more antennas in the one or more tracking opportunities.

In some aspects, the identification of the blockage is based at least in part on a signal from a blockage sensor of the UE.

In some aspects, the performance of the beam search is based at least in part on the UE being associated with a connected-mode discontinuous reception cycle.

In some aspects, a non-transitory computer-readable medium storing a set of instructions for wireless communication includes one or more instructions that, when executed by one or more processors of a UE, cause the UE to: monitor one or more antennas; identify a blockage associated with the one or more antennas based at least in part on the monitoring of the one or more antennas and based at least in part on a monitoring signal transmitted using the one or more antennas; and perform a beam search based at least in part on the identification of the blockage associated with the one or more antennas.

In some aspects, the performance of the beam search is to identify a serving beam for the UE.

In some aspects, the one or more instructions cause the UE to reduce one or more weights associated with the one or more antennas for the beam search.

In some aspects, the one or more weights indicate a number of tracking opportunities for the one or more antennas in the beam search.

In some aspects, the one or more instructions cause the UE to skip one or more tracking opportunities associated with the one or more antennas based at least in part on the blockage.

In some aspects, no beam measurement is performed by the UE in the one or more tracking opportunities based at least in part on skipping the one or more tracking opportunities.

In some aspects, the one or more instructions cause the UE to perform a beam measurement associated with a different antenna than the one or more antennas in the one or more tracking opportunities.

In some aspects, the one or more instructions cause the UE to delay a beam measurement associated with the one or more antennas in the one or more tracking opportunities.

In some aspects, the identification of the blockage is based at least in part on a signal from a blockage sensor of the UE.

In some aspects, the performance of the beam search is based at least in part on the UE being associated with a connected-mode discontinuous reception cycle.

In some aspects, an apparatus for wireless communication includes means for monitoring one or more antennas; means for identifying a blockage associated with the one or more antennas based at least in part on the monitoring of the one or more antennas and based at least in part on a monitoring signal transmitted using the one or more antennas; and means for performing a beam search based at least in part on the identification of the blockage associated with the one or more antennas.

In some aspects, the performance of the beam search is to identify a serving beam for the apparatus.

In some aspects, the means for performance of the beam search based at least in part on the identification of the blockage associated with the one or more antennas further comprises means for reducing one or more weights associated with the one or more antennas for the beam search.

In some aspects, the one or more weights indicate a number of tracking opportunities for the one or more antennas in the beam search.

In some aspects, the means for performance of the beam search based at least in part on the identification of the blockage associated with the one or more antennas further comprises means for skipping one or more tracking opportunities associated with the one or more antennas based at least in part on the blockage.

In some aspects, no beam measurement is performed by the UE in the one or more tracking opportunities based at least in part on skipping the one or more tracking opportunities.

In some aspects, the means for skipping of the one or more tracking opportunities comprises means for performing a beam measurement associated with a different antenna than the one or more antennas in the one or more tracking opportunities.

In some aspects, the means for skipping of the one or more tracking opportunities comprises means for delaying a beam measurement associated with the one or more antennas in the one or more tracking opportunities.

In some aspects, the identification of the blockage is based at least in part on a signal from a blockage sensor of the UE.

In some aspects, the performance of the beam search is based at least in part on the UE being associated with a connected-mode discontinuous reception cycle.

Some aspects described herein relate to a method of wireless communication performed by a user equipment (UE). The method may include transmitting a monitoring signal associated with one or more antennas of the UE. The method may include identifying, based at least in part on the monitoring signal, a blockage associated with the one or more antennas. The method may include performing a beam search using a decreased frequency of occurrence of tracking occasions for the one or more antennas based at least in part on the identification of the blockage associated with the one or more antennas.

Some aspects described herein relate to a user equipment (UE) for wireless communication. The user equipment may include a memory and one or more processors coupled to the memory. The one or more processors may be configured to transmit a monitoring signal associated with one or more antennas. The one or more processors may be configured to identify, based at least in part on the monitoring signal, a blockage associated with the one or more antennas. The one or more processors may be configured to perform a beam search using a decreased frequency of occurrence of tracking occasions for the one or more antennas based at least in part on the identification of the blockage associated with the one or more antennas.

Some aspects described herein relate to a non-transitory computer-readable medium that stores a set of instructions for wireless communication by a user equipment (UE). The set of instructions, when executed by one or more processors of the UE, may cause the UE to transmit a monitoring signal associated with one or more antennas. The set of instructions, when executed by one or more processors of the UE, may cause the UE to identify, based at least in part on the monitoring signal, a blockage associated with the one or more antennas. The set of instructions, when executed by one or more processors of the UE, may cause the UE to perform a beam search using a decreased frequency of occurrence of tracking occasions for the one or more antennas based at least in part on the identification of the blockage associated with the one or more antennas.

Some aspects described herein relate to an apparatus for wireless communication. The apparatus may include means for transmitting a monitoring signal associated with one or more antennas. The apparatus may include means for identifying, based at least in part on the monitoring signal, a blockage associated with the one or more antennas. The apparatus may include means for performing a beam search using a decreased frequency of occurrence of tracking occasions for the one or more antennas based at least in part on the identification of the blockage associated with the one or more antennas.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
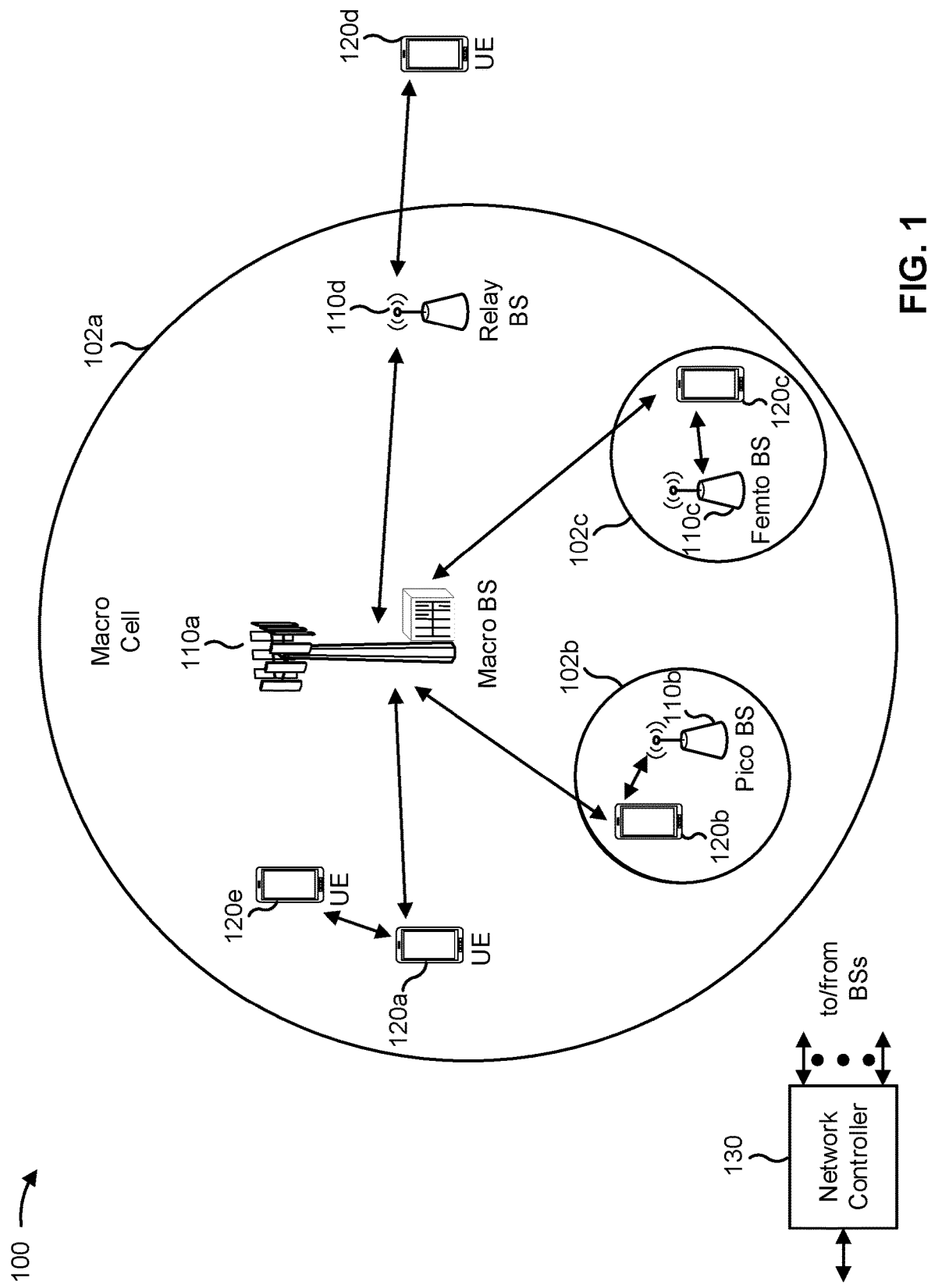
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
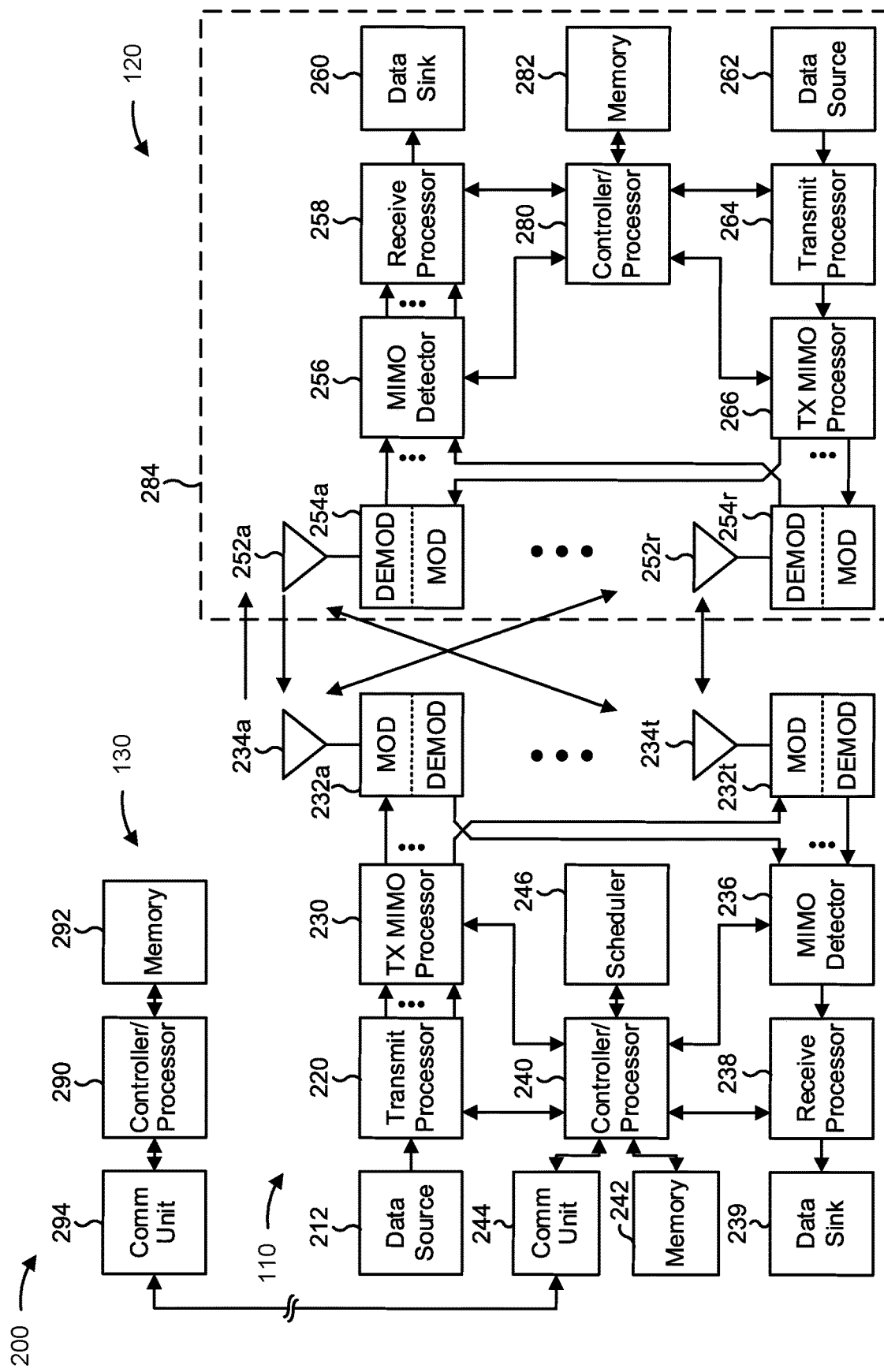
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and/or a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with blockage sensor assisted beam management, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions.

In some aspects, UE 120 may include means for monitoring one or more antennas, means for identifying a blockage associated with the one or more antennas based at least in part on the monitoring of the one or more antennas and based at least in part on a monitoring signal transmitted using the one or more antennas, means for performing a beam search based at least in part on the identification of the blockage associated with the one or more antennas, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
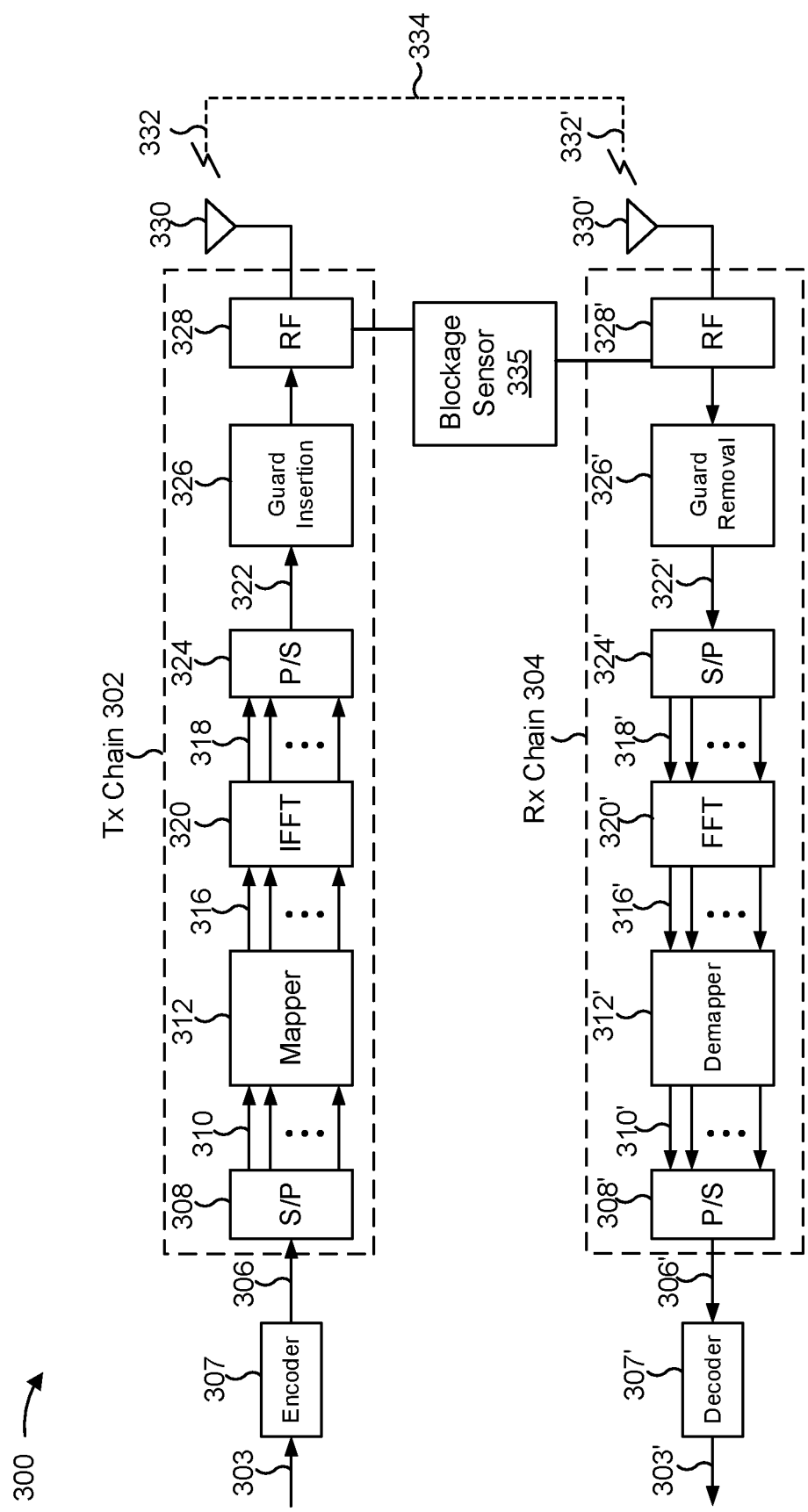
FIG. 3 is a diagram illustrating an example of a transmit (Tx) chain and a receive (Rx) chain of a UE 120, in accordance with the present disclosure.

FIG. 3 is a diagram illustrating an example 300 of a transmit (Tx) chain 302 and a receive (Rx) chain 304 of a UE 120, in accordance with the present disclosure. In some aspects, one or more components of Tx chain 302 may be implemented in transmit processor 264, TX MIMO processor 266, MOD/DEMOD 254, controller/processor 280, and/or the like, as described above in connection with FIG. 2. In some aspects, Tx chain 302 may be implemented in UE 120 for transmitting data 306 (e.g., uplink data, an uplink reference signal, uplink control information, and/or the like) to base station 110 on an uplink channel. In some aspects, a Tx chain 302 or an Rx chain 304 may be associated with an antenna module (e.g., shown in FIG. 4). For example, the UE 120 may have a respective Tx chain 302 and a respective Rx chain 304 for each antenna module of the UE 120. In some aspects, a Tx chain 302 and/or an Rx chain 304 may be associated with multiple antenna modules. In some aspects, an antenna module may be associated with multiple Tx chains 302 and/or multiple Rx chains 304.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, MOD/DEMOD 254, controller/processor 280, and/or the like, as described above in connection with FIG. 2. In some aspects, Rx chain 304 may be implemented in UE 120 for receiving data 306 (e.g., downlink data, a downlink reference signal, downlink control information, and/or the like) from base station 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

In some aspects, UE 120 may include a blockage sensor 335. Blockage sensor 335 may facilitate sensing so that UE 120 can determine whether an antenna module of UE 120 is blocked. Antenna modules are described in more detail in connection with FIG. 4. In one example, an antenna module may be blocked by a user of UE 120, such as by the user's body. In some aspects, blockage sensor 335 may be implemented as part of a modem of UE 120. In some aspects, blockage sensor 335 may be implemented as part of a Tx chain or an Rx chain of UE 120. In some aspects, blockage sensor 335 may be implemented as part of an antenna module (e.g., blockage sensor 335 may include a component that is part of the antenna module). Blockage sensor 335 may be referred to as a proximity sensor.

Blockage sensor 335 may cause a transmit antenna (e.g., an antenna module) to transmit a monitoring signal. A monitoring signal may include any signal transmittable by a UE 120. Blockage sensor 335 may monitor for the monitoring signal on a reception antenna. Based at least in part on transmitting the monitoring signal on the transmit antenna and monitoring for the monitoring signal on the reception antenna, blockage sensor 335 can determine whether a blockage is detected. For example, a blockage may cause a detectable condition at the reception antenna, such as a reflection of the monitoring signal, a modification of the monitoring signal, a measurement value of the monitoring signal that satisfies a threshold, or the like. In some aspects, a reception antenna may receive a monitoring signal, and may determine a measurement such as an RSRP associated with the monitoring signal. The determined measurement may enable the UE 120 to detect, for example, if a blockage has occurred. In some aspects, the measurement may include, for example, a signal-to-noise ratio (SNR), an RSSI, an amount of power headroom, an amount of power consumed per unit of time associated with using a transmission antenna, and/or the like. In some aspects, the reception antenna and the transmit antenna may be components of blockage sensor 335 (e.g., separate from antennas of an antenna module of the UE 120). In some aspects, one or more of the reception antenna or the transmit antenna may be an antenna of an antenna module of the UE 120. For example, the blockage sensor 335 may cause the antenna module of the UE 120 to transmit and/or monitor for the monitoring signal.

In some aspects, the UE 120 may ensure compliance with a regulatory scheme based at least in part on blockage sensor 335. For example, UEs may be subject to limitations on the amount of radiation that can be absorbed by or transmitted toward biological tissue. As one example, a maximum permissible exposure (MPE) limitation may provide a limit for UE transmit power, with the goal of avoiding harming biological tissue near the UE 120. Based at least in part on detecting a blockage using blockage sensor 335, the UE 120 can modify a transmit power or switch an active antenna module so that MPE or other regulatory limits are complied with. In some aspects, techniques described herein provide for determination of weights for a beam search based at least in part on the blockage sensor 335, as described in more detail elsewhere herein.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
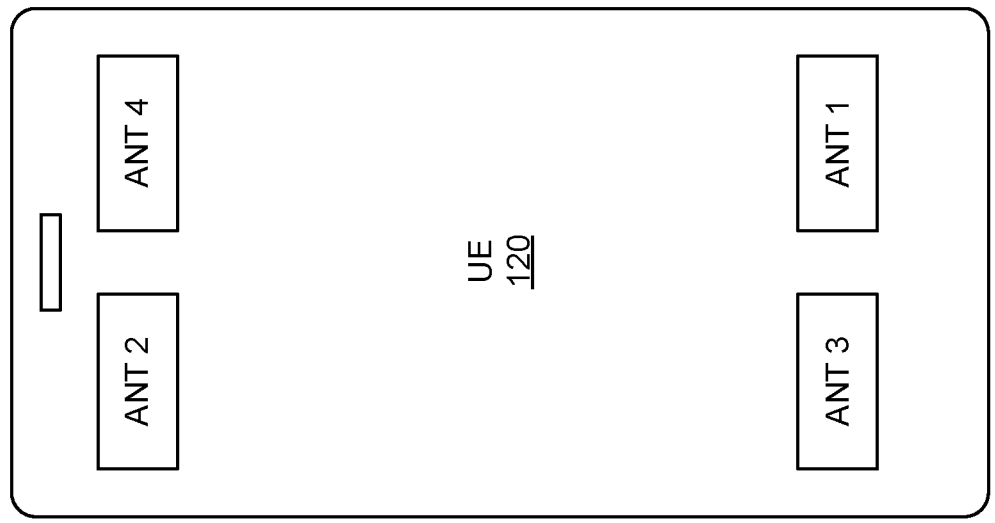
FIG. 4 is a diagram illustrating an example of a UE associated with multiple antenna modules, in accordance with the present disclosure.

FIG. 4 is a diagram illustrating an example 400 of a UE associated with multiple antenna modules, in accordance with the present disclosure. FIG. 4 shows a UE 120 capable of conducting data communication in a wireless network, such as an LTE network or a 5G/NR network. The UE 120 may conduct the data communication with a BS or another wireless device (e.g., another UE).

To conduct the data communication, the UE 120 may include transmission circuitry and reception circuitry, which is described in more detail in connection with FIG. 3. The transmission circuitry may include, among other components, a plurality of transmission antennas (e.g., antenna 330, antenna 252) and the reception circuitry may include, among other components, a plurality of reception antennas (e.g., antenna 330', antenna 252). A transmission antenna is an antenna utilized for transmitting a signal. A reception antenna is an antenna used for receiving a signal.

As shown in FIG. 4, the UE 120 may include, for example, four antenna modules: Ant 1, Ant 2, Ant 3, and Ant 4. In some aspects, an antenna module may include a single antenna that is used for transmission and/or reception, such as associated with one or more of respective transmission circuitry or reception circuitry. In some aspects, an antenna module may include multiple antennas, such as a single transmission antenna and a single reception antenna, multiple transmission antennas, and/or multiple reception antennas. In some aspects, an antenna may be used for both transmission and reception (e.g., by switching between transmission circuitry and reception circuitry). In some aspects, an antenna module may include an antenna panel.

A UE 120 may transmit a monitoring signal to detect a blockage, as described in more detail elsewhere herein. In some aspects, an antenna module may be configured to transmit the monitoring signal and/or to receive the monitoring signal. The monitoring signal may enable the UE 120 to detect a blockage associated with an antenna module. In some aspects, a reception antenna may be placed adjacent to the associated transmission antenna to configure the reception antenna to receive the one or more monitoring signals that enable the UE 120 to detect a blockage of the antenna module.

The number and arrangement of antennas shown in FIG. 4 are provided as an example. For instance, there may be additional antennas (e.g., five or more) or fewer antennas (e.g., two or three) than those shown in FIG. 4. In some aspects, the transmission and reception antennas may be arranged differently than shown in FIG. 4. Furthermore, a transmission antenna and a reception antenna shown in FIG. 4 may be implemented within a single component, or a single transmission antenna or a single reception antenna shown in FIG. 4 may be implemented as multiple, distributed components.

As indicated above, FIG. 4 is provided as an example. Other examples may differ from what is described with regard to FIG. 4.

A UE (e.g., UE 120) may perform a beam search to identify a suitable serving beam for the UE. A serving beam is a beam used by the UE to transmit or receive signaling, such as control signaling or data signaling. The UE may perform the beam search based at least in part on signaling on a plurality of beams. For example, a BS (e.g., BS 110) may transmit a reference signal (e.g., a synchronization signal block set) on the plurality of beams. The UE may perform a beam measurement on one or more receive beams (e.g., via one or more receive antennas) to identify a best beam pair. For example, the beam measurement may generally indicate a signal strength of the synchronization signal block set on a given beam pair. A beam pair includes a transmit beam (generated by the BS 110) and a receive beam (generated by the UE 120).

Figure 6:
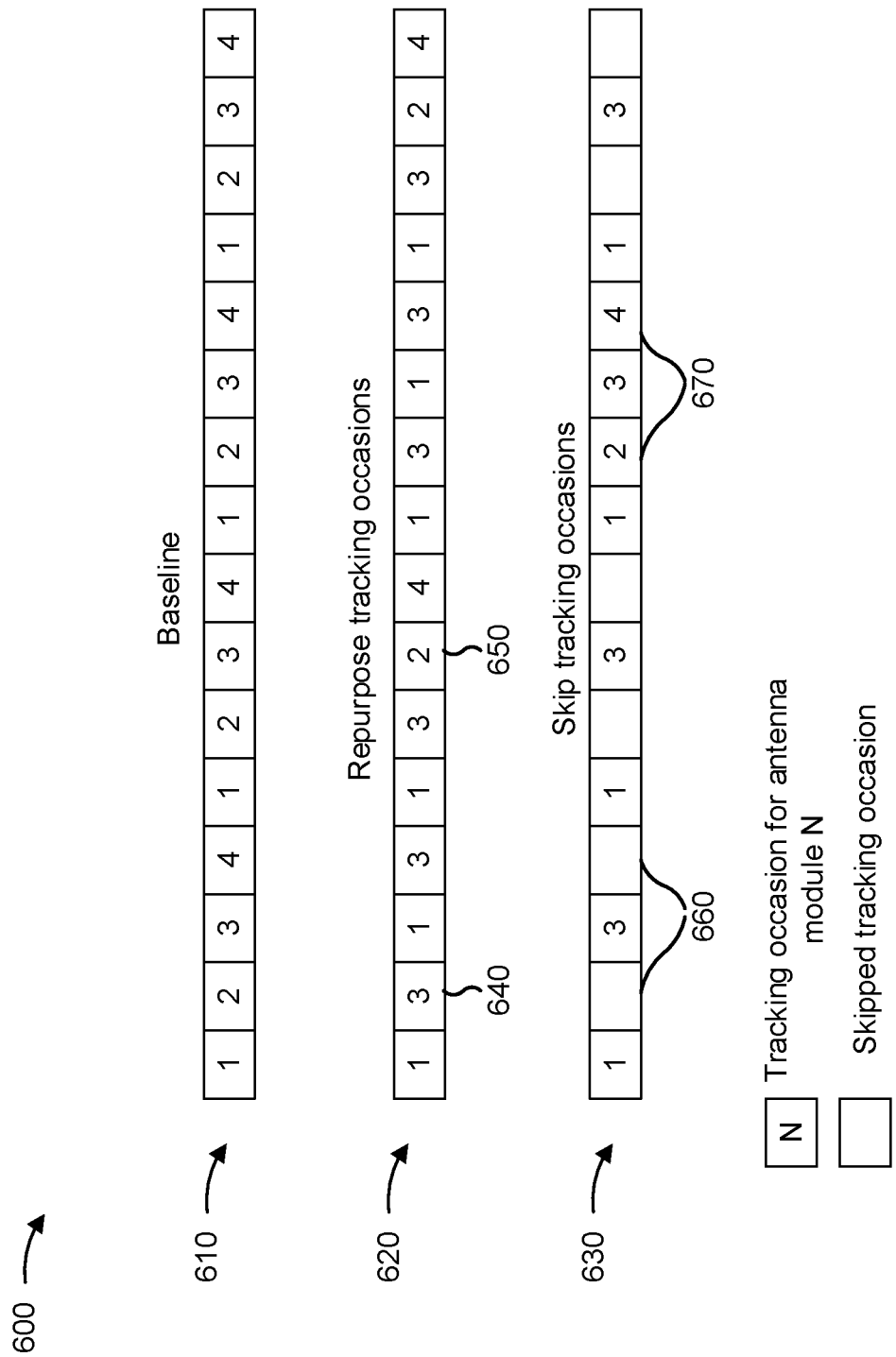
FIG. 6 is a diagram illustrating an example of tracking occasions for a beam search, in accordance with the present disclosure.

In some cases, the UE may perform a beam search based at least in part on a measurement schedule. A measurement schedule may indicate tracking opportunities associated with a plurality of antenna modules. The UE may perform a beam measurement for a given antenna module on a tracking opportunity associated with the given antenna module. A tracking opportunity is a time and/or frequency resource (or set of resources) in which beam measurement is performed for an antenna module. In some aspects, a tracking opportunity may correspond to a configured measurement resource. By performing a series of beam measurements in a series of tracking opportunities in accordance with a measurement schedule, the UE may perform a beam search. In some cases, a set of antenna modules may be associated with respective weights in a measurement schedule. A weight, for an antenna module, may indicate how often the antenna module's tracking opportunities occur in a measurement schedule relative to other antenna modules' tracking opportunities. For example, if a measurement schedule includes tracking opportunities for four equally weighted antenna modules, then the measurement schedule may include a same number of tracking opportunities for each of the four antenna modules, and/or the tracking opportunities for each of the four antenna modules may occur equally often (e.g., with the same frequency of occurrence). This is illustrated in FIG. 6. In some deployments, tracking opportunities may be distributed in time, and may be separated by a synchronization signal block periodicity (e.g., 20 ms, or another length of time). Thus, the UE may perform a beam measurement for a first set of beams (e.g., a first antenna module) in a first tracking opportunity, and may wait for the synchronization signal block periodicity until a performing a beam measurement for a second set of beams (e.g., a second antenna module) in a second tracking opportunity.

There are various scenarios in which equally weighting tracking opportunities for each antenna module may be suboptimal. For example, a first antenna module may often be associated with poorer beam performance than a second antenna module, due to a location of the first antenna module on the UE, a blockage, or the like. Thus, modifying the weights of the first antenna module and/or the second antenna module so that the first antenna module is associated with fewer tracking opportunities than the second antenna module may improve utilization of measurement resources of the UE, thereby reducing resource consumption and power consumption. One approach for weighting tracking opportunities is to assign weights based at least in part on beam measurements in the tracking opportunities. For example, if a particular antenna module is associated with a poor beam measurement (such as based at least in part on a measurement of a reference signal transmitted via a beam received by the particular antenna module), then the UE or the BS could reduce a weight associated with the particular antenna module (so that beam measurements of the particular antenna module are less frequent than beam measurements of other antenna module(s) of the UE).

However, beam measurement based weighting of tracking opportunities may involve significant delay and overhead, since synchronization signal block sets are spaced from each other by a length of time. For example, in the case of equal weights, four antenna modules, and a 20 ms synchronization signal block periodicity, the UE may perform beam measurements for each antenna module only every 80 ms. If a weight of an antenna module is reduced so that the antenna module is measured half as often as the other three antenna modules, then the UE may perform beam measurements for the antenna module even less frequently. Furthermore, some causes of poor antenna module performance (e.g., blockages, clusters in the channel, or the like) may change more frequently than the beam measurements can be performed. The delay in performing beam measurements can cause delays in communications, missed communications (such as associated with an active time of a discontinuous reception cycle), negative user experiences, and increased warm up time for a connected-mode discontinuous reception (C-DRX) cycle.

Some techniques and apparatuses described herein provide configuration of beam measurement based at least in part on a blockage sensor of a UE. For example, the UE may determine weights for tracking opportunities associated with a plurality of antenna modules based at least in part on the blockage sensor of the UE. More particularly, the UE may decrease a weight of an antenna module (e.g., so that tracking opportunities associated with the antenna module occur less frequently) based at least in part on identifying a blockage associated with the antenna module. In some aspects, the UE may skip a tracking opportunity associated with a blocked antenna module (e.g., may not perform a beam measurement for a different antenna module in the tracking opportunity), which conserves power of the UE. In some aspects, the UE may perform a beam measurement for a different antenna module in the tracking opportunity (e.g., may replace the blocked antenna module's tracking opportunity with a different antenna's tracking opportunity), which improves mobility tracking and reduces latency. In this way, the UE reduces latency associated with beam searching. Furthermore, by reducing delay associated with beam searching, the UE reduces warm up time for a C-DRX cycle.

Figure 5:
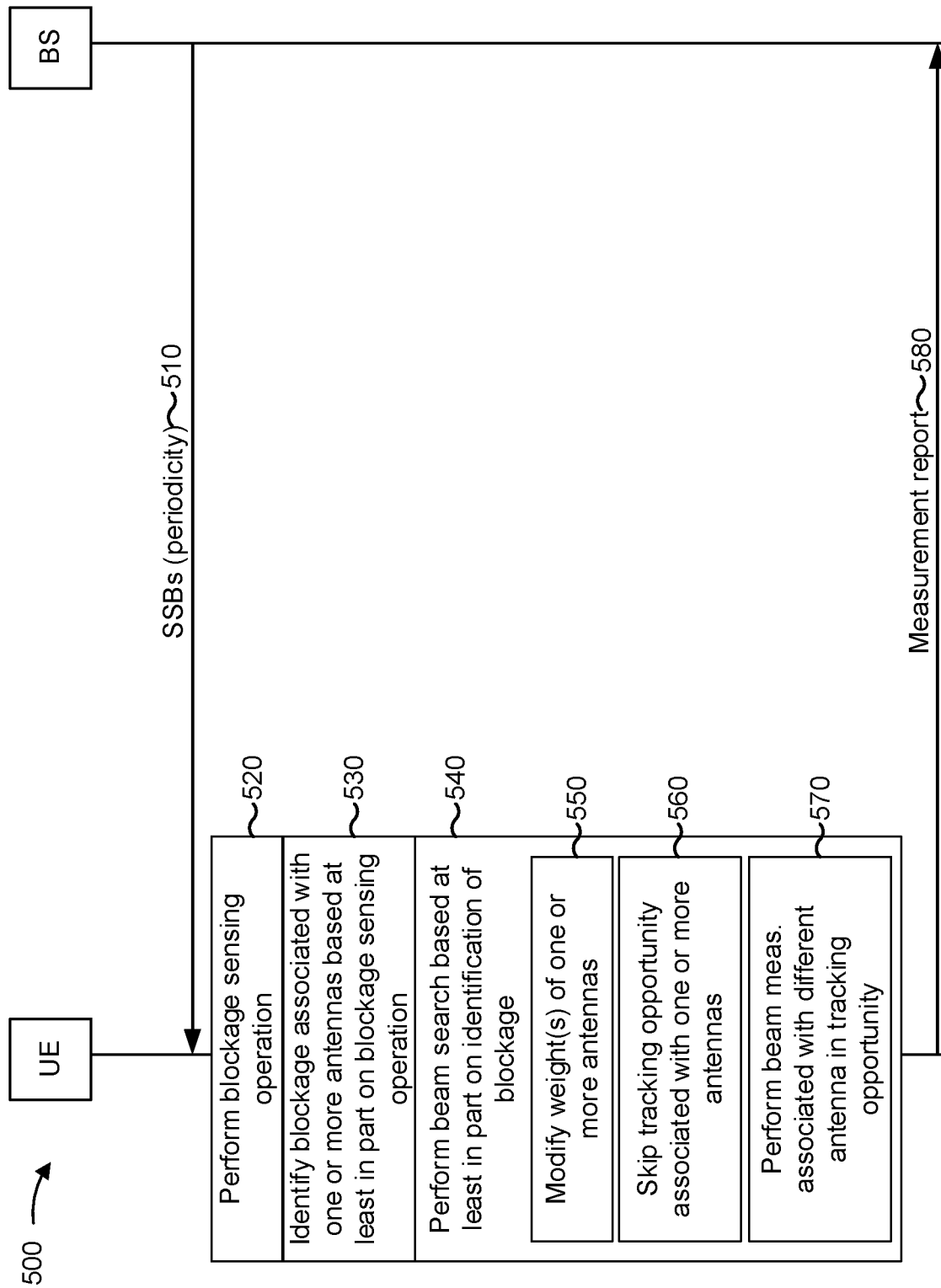
FIG. 5 is a diagram illustrating an example of signaling associated with performing a beam search based at least in part on a blockage sensor, in accordance with the present disclosure.

FIG. 5 is a diagram illustrating an example 500 of signaling associated with performing a beam search based at least in part on a blockage sensor, in accordance with the present disclosure. As shown, example 500 includes a UE (e.g., UE 120) and a BS (e.g., BS 110). The UE may be associated with a plurality of antenna modules, which are described in more detail in connection with FIG. 4.

As shown in FIG. 5, and by reference number 510, the BS may transmit synchronization signal blocks (SSBs) to the UE 120. For example, the BS may transmit the SSBs using a plurality of transmit beams to facilitate a beam search by the UE. In some aspects, the BS may transmit the SSBs in accordance with an SSB periodicity, which may be configured by the base station or indicated in system information.

An SSB is sometimes referred to as a synchronization signal/physical broadcast channel block.

As shown by reference number 520, the UE may perform a blockage sensing operation. For example, the UE may perform the blockage sensing operation with regard to one or more antenna modules of the plurality of antenna modules. The blockage sensing operation may include transmitting a monitoring signal on a transmit antenna and monitoring for the monitoring signal on a receive antenna. If the reception of the monitoring signal satisfies a criterion (e.g., based at least in part on a received signal strength or another property of the reception of the monitoring signal), the UE may identify a blockage with regard to the antenna module associated with the monitoring signal. In some aspects, the transmit antenna and the receive antenna may be the same antenna. In some aspects, one or more of the transmit antenna or the receive antenna may be an antenna of the antenna module. In some aspects, the transmit antenna and the receive antenna may be different antennas. In some aspects, the UE may perform the blockage sensing operation without transmitting the monitoring signal. For example, the UE may monitor a signal (e.g., a signal transmitted by the BS) on each antenna module, and may identify a blockage of an antenna module based at least in part on monitoring the signal on each antenna module.

In some aspects, the UE may perform the blockage sensing operation with a different periodicity than a beam sensing operation. For example, the UE may perform the blockage sensing operation with a periodicity of X ms and perform the beam sensing operation with a periodicity of Y ms (Y may be defined by the SSB periodicity), where X is less than Y. As another example, the UE may perform the blockage sensing operation aperiodically, based at least in part on a trigger determined by the UE, or the like. By performing the blockage sensing operation more frequently than the beam sensing operation, the UE can identify blockages and configure weights for a beam search with a shorter latency than if the weights are determined based only on the beam sensing operation.

As shown by reference number 530, the UE may identify a blockage associated with one or more antennas. For example, the UE may identify a blockage associated with an antenna module (e.g., one or more antenna modules) of the UE. The UE may identify the blockage based at least in part on the blockage sensing operation. For example, the UE may determine that a criterion is satisfied with regard to monitoring of a monitoring signal associated with an antenna module. A monitoring signal may be said to be associated with an antenna module if the monitoring signal can be measured to detect a blockage of the antenna module. For example, the monitoring signal may be transmitted by the antenna module, or may be transmitted by a blockage sensor associated with the antenna module.

As shown by reference number 540, the UE may perform a beam search based at least in part on the identification of the blockage. For example, the UE may determine weights for tracking occasions of the beam search based at least in part on the identification of the blockage. In some aspects, as shown by reference number 550, the UE may decrease a weight (e.g., decrease a frequency of occurrence of tracking occasions) for an antenna module associated with a blockage, and/or may increase a weight (e.g., may increase a frequency of occurrence of tracking occasions) for an antenna module that is not associated with a blockage. In some aspects, the UE may decrease a frequency of occurrence of tracking occasions for an antenna module relative to a prior frequency of occurrence of tracking occasions of the antenna module. For example, the UE may increase a periodicity of the tracking occasions for the antenna module. In some aspects, the UE may decrease a frequency of occurrence of tracking occasions for a first antenna module relative to a frequency of occurrence of tracking occasions of a second antenna module. For example, the UE may use a lower frequency of occurrence for the first antenna module based at least in part on the first antenna module being associated with a blockage, and may use a higher frequency of occurrence for the second antenna module based at least in part on the second antenna module not being associated with a blockage. For example, for a blockage within a first range of the N possible degrees, the weight (associated with how often the antenna module is being tracked) is determined to be a first value, while for a blockage falling within a second range, the weight can be determined to be a second value. In some aspects, the UE may perform one or more of the operations shown by reference numbers 560 and 570, as described in more detail below.

In some aspects, the UE may adjust a frequency of occurrence of tracking occasions by a fixed amount based at least in part on a blockage. For example, the UE may use a first weight for unblocked antenna modules, and may use a second weight, different than the first weight, for blocked antenna modules. In some aspects, the UE may adjust a frequency of occurrence of tracking occasions based at least in part on a length of time for which the blockage has been detected. For example, the UE may use a lower weight (leading to fewer tracking occasions) for a longer blockage than for a shorter blockage. As another example, the UE may use a decreased frequency of occurrence until a blockage is no longer detected, then may return to a baseline frequency of occurrence.

As shown by reference number 560, in some aspects, the UE may skip a tracking opportunity associated with the one or more antennas. For example, the UE may not perform a beam measurement for any antenna module of the UE during a tracking opportunity associated with the one or more antennas. In some aspects, the UE may skip a subset of tracking opportunities associated with the one or more antennas (e.g., may skip M out of every N tracking opportunities, where M and N are integers). Skipping a tracking opportunity may conserve sensing resources of the UE that would otherwise be used to perform beam sensing in each tracking opportunity associated with a blocked antenna module. In some aspects, during a skipped tracking opportunity, the UE may enter a low power state, perform a micro-sleep, or the like, which further conserves power of the UE.

As shown by reference number 570, in some aspects, the UE may perform a beam measurement associated with a different antenna (e.g., a different antenna module) than the one or more antennas associated with the blockage. For example, the UE may perform the beam measurement associated with the different antenna in a tracking opportunity associated with the one or more antennas associated with the blockage. Performing the beam measurement associated with the different antenna may reduce latency and improve speed of beam searching relative to skipping a tracking opportunity. In some aspects, the UE may perform a combination of skipping a tracking opportunity and performing a beam measurement associated with a different antenna in a tracking opportunity. For example, the UE may skip one or more tracking opportunities associated with a blocked antenna, and may repurpose another one or more tracking opportunities for another antenna's beam measurement. In some aspects, the UE may perform only one of the operations shown by reference numbers 560 and 570. For examples of skipping beam measurements and performing beam measurements associated with different antennas, refer to FIG. 6.

As shown by reference number 580, the UE may transmit a measurement report based at least in part on the beam search. For example, the measurement report may indicate measurement values associated with transmit beams of the BS and/or receive beams of the UE, such as measurement values determined based at least in part on the beam search. In some aspects, the measurement report may indicate a selected beam, a selected set of beams, or the like. Thus, the UE may determine and report beam measurements for a plurality of beams based at least in part on identifying a blockage of one or more antenna modules at the UE. Based at least in part on identifying the blockage, the UE can modify weights of antenna modules for a beam search, thereby improving resource utilization of the UE and reducing latency associated with the beam search.

As indicated above, FIG. 5 is provided as an example. Other examples may differ from what is described with regard to FIG. 5.

FIG. 6 is a diagram illustrating an example 600 of tracking occasions for a beam search, in accordance with the present disclosure. Example 600 shows a baseline beam search (shown by reference number 610), a beam search where tracking occasions associated with a blocked antenna module are used for other antenna modules (shown by reference number 620), and a beam search where tracking occasions associated with a blocked antenna module are skipped (shown by reference number 630). Example 600 is for a UE with four antenna modules. Tracking occasions associated with each of the four antenna modules are denoted by "1," "2," "3," and "4," respectively. For example, a tracking occasion labeled "1" is associated with a first antenna module, a tracking occasion associated labeled "2" is associated with a second antenna module, and so on. A tracking occasion that is skipped (e.g., in which the UE does not perform a beam measurement for any of the four antenna modules) is denoted by an empty rectangle. In example 600, antenna modules 2 and 4 are associated with a blockage. For example, the UE may identify the blockage as described in connection with FIGS. 4 and 5.

In the baseline beam search, each antenna module is associated with an equal weight. Therefore, the UE performs beam measurement for each antenna module on an equal number of tracking occasions. While the order is shown as [1 2 3 4], the UE can use any order for the beam measurements, so long as the weights associated with the respective antenna modules are satisfied. However, by performing beam measurements for unblocked antenna modules 1 and 3 at the same frequency as blocked antenna modules 2 and 4, the UE uses measurement resources and delays the identification of a suitable serving beam, which is unlikely to be associated with antenna modules 2 and 4.

In the beam search shown by reference number 620, the UE repurposes tracking occasions associated with antenna modules 2 and 4 (such as described with regard to reference number 570 of FIG. 5). For example, rather than performing a beam measurement for the blocked antenna module 2 in the tracking occasion shown by reference number 640, the UE performs a beam measurement for the unblocked antenna module 3. Thus, the UE prioritizes beam measurements on unblocked antenna modules and reduces delay associated with the beam measurements on the unblocked antenna modules. Furthermore, the UE can perform a reduced number of beam measurements (e.g., on a reduced number of tracking occasions, in accordance with a reduced frequency of occurrence of tracking occasions) for a blocked antenna module, such as shown, for example, by reference number 650, where beam measurements are performed less frequently on antenna modules 2 and 4. For example, the UE may determine the reduced number based at least in part on weights associated with the four antenna modules. In the beam search shown by reference number 620, the tracking occasions associated with antenna modules 1 and 3 are associated with a weight of 1, and the tracking occasion associated with antenna modules 2 and 4 are associated with a weight of ⅓ (since three tracking occasions associated with antenna modules 1 and 3 occur for each tracking occasion associated with antenna modules 2 and 4).

In the beam search shown by reference number 630, the UE skips a subset of tracking occasions associated with blocked antenna modules. For example, the UE skips tracking occasions associated with blocked antenna modules 2 and 4, as shown by reference number 660. In some aspects, the UE may perform beam measurements on a subset of the tracking occasions associated with blocked antenna modules 2 and 4, as shown by reference number 670. For example, the UE may determine the subset based at least in part on weights associated with the four antenna modules. In other aspects (not shown), the UE may perform no beam measurements for blocked antenna modules 2 and 4. In the beam search shown by reference number 630, the tracking occasions associated with antenna modules 1 and 3 are associated with a weight of 1, and the tracking occasion associated with antenna modules 2 and 4 are associated with a weight of ⅓ (since three tracking occasions associated with antenna modules 1 and 3 occur for each tracking occasion associated with antenna modules 2 and 4).

While the techniques and apparatuses described herein are generally described with regard to a binary determination of a blockage (e.g., an antenna module is either identified as associated with a blockage or not associated with a blockage), the techniques and apparatuses described herein can also be applied using a non-binary approach. For example, the UE (e.g., UE 120) may determine a degree of blockage associated with an antenna module (e.g., such as using a quantized scale with N possible degrees of blockage, where N is an integer greater than zero). The UE may modify a weight associated with the antenna module based at least in part on the degree of blockage. For example, the UE may perform a greater modification of the weight for an antenna module associated with a greater degree of blockage than for an antenna module associated with a lesser degree of blockage (e.g., lesser than the greater degree of blockage). For example, for blockage within a first range of N possible degrees, the weight is determined to be a first value, while for a blockage falling within a second range, the weight can be determined to be a second value.

As indicated above, FIG. 6 is provided as an example. Other examples may differ from what is described with regard to FIG. 6.

Figure 7:
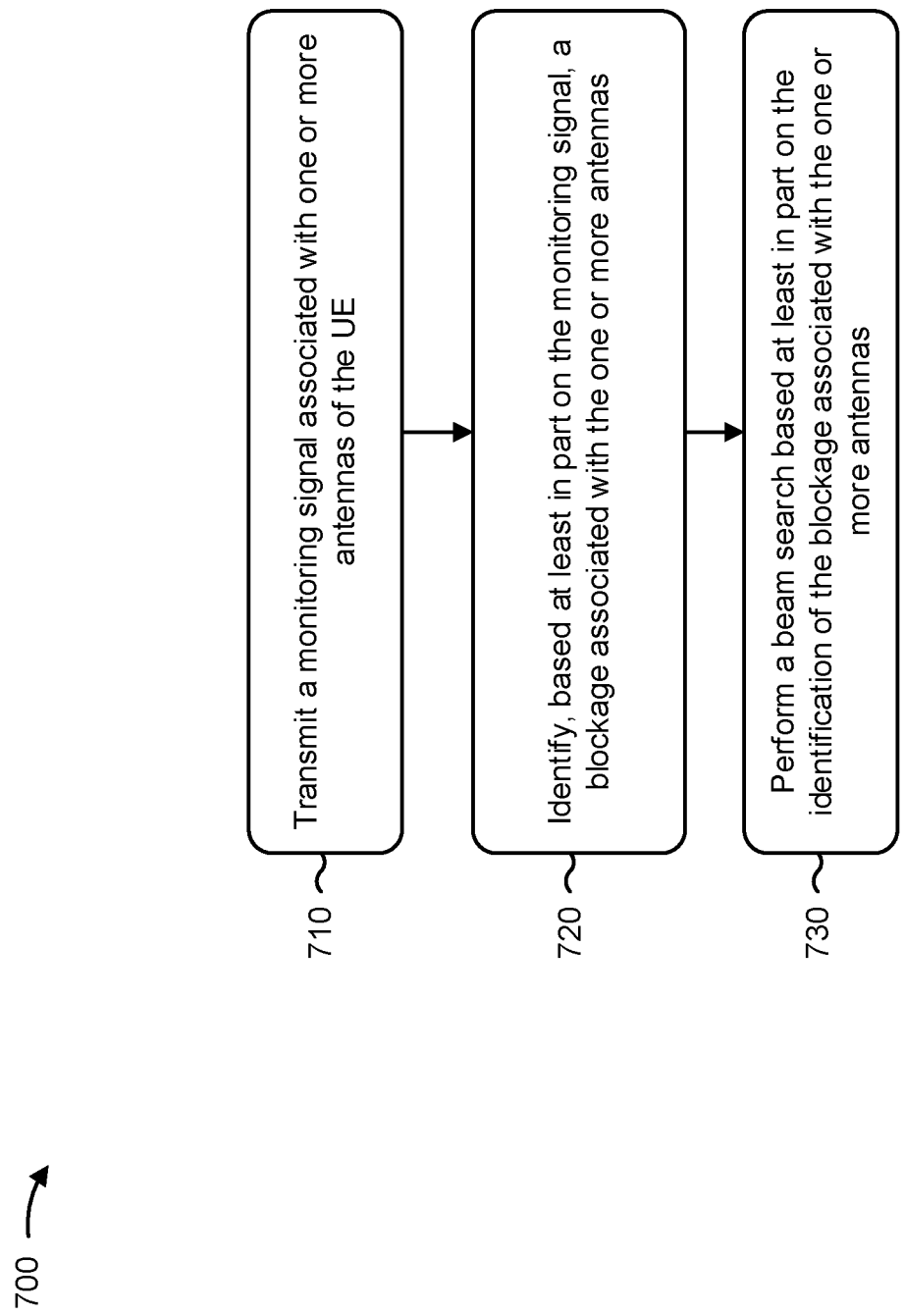
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for blockage sensor assisted beam management.

As shown in FIG. 7, in some aspects, process 700 may include transmitting a monitoring signal associated with one or more antennas of the UE (block 710). For example, the UE (e.g., using monitoring component 808) may transmitting a monitoring signal associated with one or more antennas of the UE. In some aspects, a blockage sensor of the UE may transmit the monitoring signal or may trigger the one or more antennas to transmit the monitoring signal. In some aspects, the one or more antennas may be associated with an antenna module.

As further shown in FIG. 7, in some aspects, process 700 may include identifying, based at least in part on the monitoring signal, a blockage associated with the one or more antennas based at least in part on the monitoring of the one or more antennas (block 720). For example, the UE (e.g., using monitoring component 808, depicted in FIG. 8) may identify a blockage associated with the one or more antennas based at least in part on a monitoring signal, as described above.

As further shown in FIG. 7, in some aspects, process 700 may include performing a beam search based at least in part on the identification of the blockage associated with the one or more antennas (block 730). For example, the UE (e.g., using beam search component 810, depicted in FIG. 8) may perform a beam search based at least in part on the identification of the blockage associated with the one or more antennas, as described above.

Process 700 may include additional aspects, such as any single aspect or any combination of aspects described below and/or in connection with one or more other processes described elsewhere herein.

In a first aspect, the performance of the beam search is to identify a serving beam for the UE.

In a second aspect, alone or in combination with the first aspect, performance of the beam search using the decreased frequency of occurrence of tracking occasions for the one or more antennas based at least in part on the identification of the blockage associated with the one or more antennas further comprises reducing one or more weights associated with the one or more antennas for the beam search, wherein the one or more weights are used to determine a frequency of occurrence of tracking occasions for the one or more antennas.

In a third aspect, alone or in combination with one or more of the first and second aspects, the one or more weights indicate a number of tracking opportunities for the one or more antennas in the beam search.

In a fourth aspect, alone or in combination with one or more of the first through third aspects, performance of the beam search using the decreased frequency of occurrence of tracking occasions for the one or more antennas based at least in part on the identification of the blockage associated with the one or more antennas further comprises skipping one or more tracking opportunities associated with the one or more antennas based at least in part on the blockage.

In a fifth aspect, alone or in combination with one or more of the first through fourth aspects, no beam measurement is performed by the UE in the one or more tracking opportunities based at least in part on skipping the one or more tracking opportunities.

In a sixth aspect, alone or in combination with one or more of the first through fifth aspects, the skipping of the one or more tracking opportunities comprises performing, in the one or more tracking opportunities, a beam measurement associated with an antenna (e.g., a different antenna) other than the one or more antennas in the one or more tracking opportunities.

In a seventh aspect, alone or in combination with one or more of the first through sixth aspects, the skipping of the one or more tracking opportunities comprises delaying a beam measurement associated with the one or more antennas in the one or more tracking opportunities.

In an eighth aspect, alone or in combination with one or more of the first through seventh aspects, the identification of the blockage is based at least in part on a signal from a blockage sensor of the UE.

In a ninth aspect, alone or in combination with one or more of the first through eighth aspects, the performance of the beam search is based at least in part on the UE being associated with a connected-mode discontinuous reception cycle. For example, the performance of the beam search may be based at least in part on the UE entering a warm up time for a connected-mode discontinuous reception cycle.

In a tenth aspect, alone or in combination with one or more of the first through ninth aspects, the decreased frequency of occurrence of tracking occasions for the one or more antennas is relative to a prior frequency of occurrence of tracking occasions for the one or more antennas.

In an eleventh aspect, alone or in combination with one or more of the first through tenth aspects, the decreased frequency of occurrence of tracking occasions for the one or more antennas is relative to a frequency of occurrence of tracking occasions associated with a group of antennas, other than the one or more antennas, that is not associated with a blockage.

In a twelfth aspect, alone or in combination with one or more of the first through eleventh aspects, identifying the blockage is based at least in part on sensing a received power of the monitoring signal.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
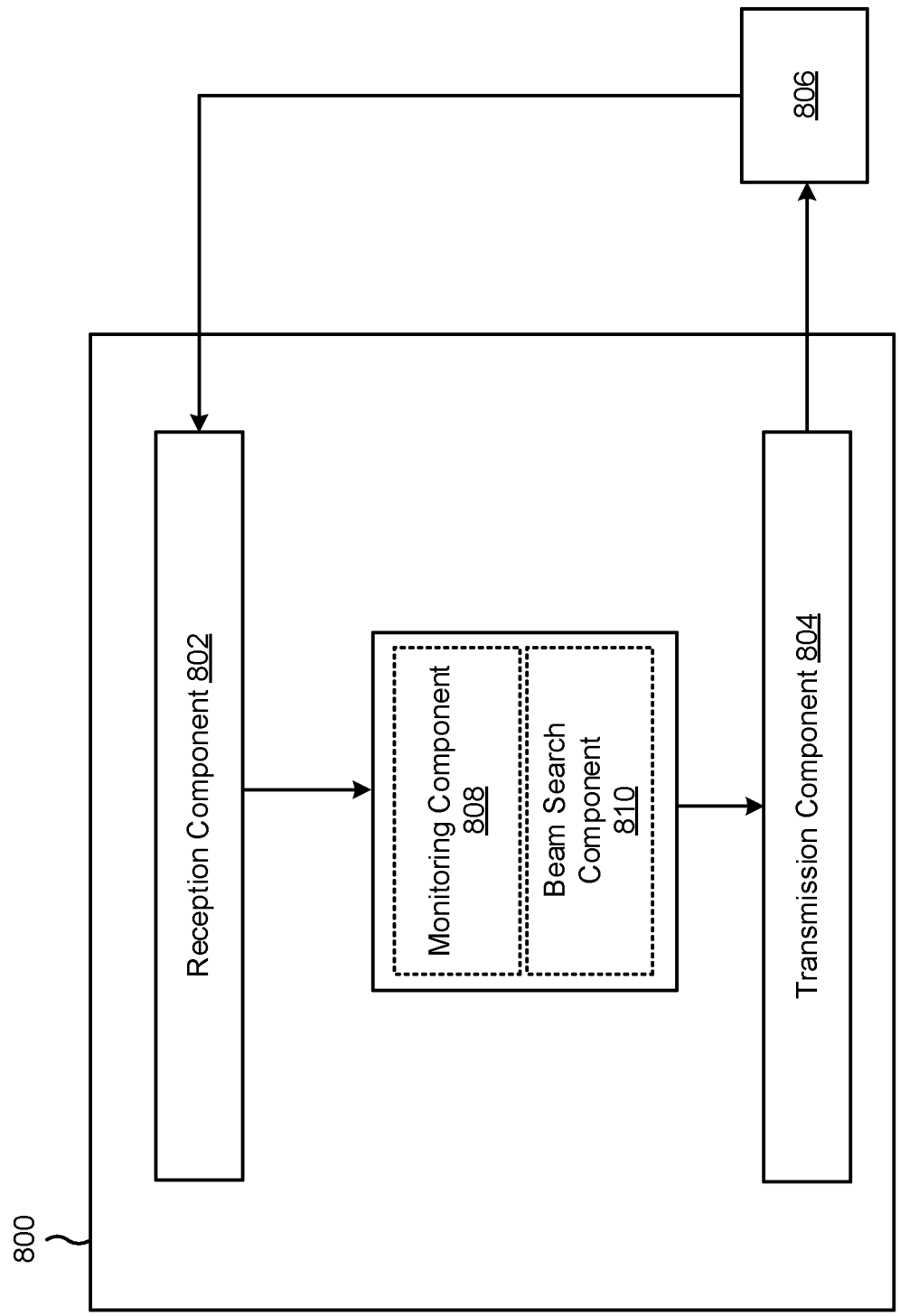
FIG. 8 is a block diagram of an example apparatus for wireless communication, in accordance with the present disclosure.

FIG. 8 is a block diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a monitoring component 808 and a beam search component 810, among other examples.

In some aspects, the apparatus 800 may be configured to perform one or more operations described herein in connection with FIGS. 3-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission component 804 may transmit a monitoring signal associated with one or more antennas of the apparatus 800. The monitoring component 808 may monitor one or more antennas. The monitoring component 808 may identify a blockage associated with the one or more antennas based at least in part on the monitoring of the one or more antennas and/or based at least in part on a monitoring signal transmitted using the one or more antennas. In some aspects, the monitoring component 808 may include one or more antennas, a demodulator, a MIMO detector, a receive processor, a controller/processor, a memory, or a combination thereof, of the UE described above in connection with FIG. 2. In some aspects, the monitoring component 808 may include blockage sensor 335.

The beam search component 810 may perform a beam search based at least in part on the identification of the blockage associated with the one or more antennas. In some aspects, the beam search component 810 may include one or more antennas, a demodulator, a MIMO detector, a receive processor, a controller/processor, a memory, or a combination thereof, of the UE described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting a monitoring signal associated with one or more antennas of the UE; identifying, based at least in part on the monitoring signal, a blockage associated with the one or more antennas; and performing a beam search using a decreased frequency of occurrence of tracking occasions for the one or more antennas based at least in part on the identification of the blockage associated with the one or more antennas.

Aspect 2: The method of Aspect 1, wherein the performance of the beam search is to identify a serving beam for the UE.

Aspect 3: The method of any of Aspects 1-2, wherein performance of the beam search using the decreased frequency of occurrence of tracking occasions for the one or more antennas based at least in part on the identification of the blockage associated with the one or more antennas further comprises: reducing one or more weights associated with the one or more antennas for the beam search, wherein the one or more weights are used to determine a frequency of occurrence of tracking occasions for the one or more antennas.

Aspect 4: The method of any of Aspects 1-3, wherein performance of the beam search using the decreased frequency of occurrence of tracking occasions for the one or more antennas based at least in part on the identification of the blockage associated with the one or more antennas further comprises: skipping one or more tracking opportunities associated with the one or more antennas based at least in part on the blockage.

Aspect 5: The method of Aspect 4, wherein no beam measurement is performed by the UE in any of the one or more tracking opportunities based at least in part on skipping the one or more tracking opportunities.

Aspect 6: The method of Aspect 4, wherein the skipping of the one or more tracking opportunities comprises: performing, in the one or more tracking opportunities, a beam measurement associated with an antenna other than the one or more antennas.

Aspect 7: The method of Aspect 4, wherein the skipping of the one or more tracking opportunities comprises: delaying a beam measurement associated with the one or more antennas in the one or more tracking opportunities.

Aspect 8: The method of any of Aspects 1-7, wherein the identification of the blockage is based at least in part on a signal from a blockage sensor of the UE.

Aspect 9: The method of any of Aspects 1-8, wherein the performance of the beam search is based at least in part on the UE entering a warm up time for a connected-mode discontinuous reception cycle.

Aspect 10: The method of any of Aspects 1-9, wherein the decreased frequency of occurrence of tracking occasions for the one or more antennas is relative to a prior frequency of occurrence of tracking occasions for the one or more antennas.

Aspect 11: The method of any of Aspects 1-10, wherein the decreased frequency of occurrence of tracking occasions for the one or more antennas is relative to a frequency of occurrence of tracking occasions associated with a group of antennas, other than the one or more antennas, that is not associated with a blockage.

Aspect 12: The method of any of Aspects 1-11, wherein identifying the blockage is based at least in part on sensing a received power of the monitoring signal.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting a monitoring signal associated with one or more antennas of the UE;
    performing a beam search using a decreased frequency of occurrence of tracking occasions for the one or more antennas based at least in part on an identification of a blockage associated with the one or more antennas, the identification being based at least in part on the monitoring signal, the decreased frequency of occurrence of tracking occasions for the one or more antennas being relative to a prior frequency of occurrence of tracking occasions for the one or more antennas.

2. The method of claim 1, wherein the performance of the beam search is to identify a serving beam for the UE.

3. The method of claim 1, wherein performance of the beam search using the decreased frequency of occurrence of tracking occasions for the one or more antennas based at least in part on the identification of the blockage associated with the one or more antennas further comprises:
    reducing one or more weights associated with the one or more antennas for the beam search, wherein the one or more weights are used to determine a frequency of occurrence of tracking occasions for the one or more antennas.

4. The method of claim 1, wherein performance of the beam search using the decreased frequency of occurrence of tracking occasions for the one or more antennas based at least in part on the identification of the blockage associated with the one or more antennas further comprises:
    skipping one or more tracking opportunities associated with the one or more antennas based at least in part on the blockage.

5. The method of claim 4, wherein no beam measurement is performed by the UE in any of the one or more tracking opportunities based at least in part on skipping the one or more tracking opportunities.

6. The method of claim 4, wherein the skipping of the one or more tracking opportunities comprises:
    performing, in the one or more tracking opportunities, a beam measurement associated with an antenna other than the one or more antennas.

7. The method of claim 4, wherein the skipping of the one or more tracking opportunities comprises:
delaying a beam measurement associated with the one or more antennas in the one or more tracking opportunities.

8. The method of claim 1, wherein the identification of the blockage is based at least in part on a signal from a blockage sensor of the UE.

9. The method of claim 1, wherein the performance of the beam search is based at least in part on the UE entering a warm up time for a connected-mode discontinuous reception cycle.

10. The method of claim 1, wherein the decreased frequency of occurrence of tracking occasions for the one or more antennas is relative to a frequency of occurrence of tracking occasions associated with a group of antennas, other than the one or more antennas, that is not associated with a blockage.

11. The method of claim 1, wherein identifying the blockage is based at least in part on sensing a received power of the monitoring signal.

12. A user equipment (UE) for wireless communication, comprising:
a memory; and
one or more processors, coupled to the memory, configured to:
transmit a monitoring signal associated with one or more antennas; and
perform a beam search using a decreased frequency of occurrence of tracking occasions for the one or more antennas based at least in part on an identification of a blockage associated with the one or more antennas, the identification being based at least in part on the monitoring signal, the decreased frequency of occurrence of tracking occasions for the one or more antennas being relative to a prior frequency of occurrence of tracking occasions for the one or more antennas.

13. The UE of claim 12, wherein the performance of the beam search is to identify a serving beam for the UE.

14. The UE of claim 12, wherein the one or more processors, to perform the beam search using the decreased frequency of occurrence of tracking occasions for the one or more antennas based at least in part on the identification of the blockage associated with the one or more antennas, are configured to:
reduce one or more weights associated with the one or more antennas for the beam search.

15. The UE of claim 12, wherein the one or more processors, to perform the beam search using the decreased frequency of occurrence of tracking occasions for the one or more antennas based at least in part on the identification of the blockage associated with the one or more antennas, are configured to:
skip one or more tracking opportunities associated with the one or more antennas based at least in part on the blockage.

16. The UE of claim 15, wherein no beam measurement is performed by the UE in the one or more tracking opportunities based at least in part on skipping the one or more tracking opportunities.

17. The UE of claim 15, wherein the one or more processors, to skip the one or more tracking opportunities, are configured to:
perform a beam measurement associated with a different antenna than the one or more antennas in the one or more tracking opportunities.

18. The UE of claim 15, wherein the one or more processors, to skip the one or more tracking opportunities, are configured to:
delay a beam measurement associated with the one or more antennas in the one or more tracking opportunities.

19. The UE of claim 12, wherein the identification of the blockage is based at least in part on a signal from a blockage sensor of the UE.

20. The UE of claim 12, wherein the decreased frequency of occurrence of tracking occasions for the one or more antennas is relative to a frequency of occurrence of tracking occasions associated with a group of antennas that is not associated with a blockage.

21. A non-transitory computer-readable medium storing a set of instructions for wireless communication, the set of instructions comprising:
one or more instructions that, when executed by one or more processors of a user equipment (UE), cause the UE to:
transmit a monitoring signal associated with one or more antennas;
perform a beam search using a decreased frequency of occurrence of tracking occasions for the one or more antennas based at least in part on an identification of a blockage associated with the one or more antennas, the identification being based at least in part on the monitoring signal, the decreased frequency of occurrence of tracking occasions for the one or more antennas being relative to a prior frequency of occurrence of tracking occasions for the one or more antennas.

22. The non-transitory computer-readable medium of claim 21, wherein the one or more instructions further cause the UE to identify a serving beam for the UE.

23. The non-transitory computer-readable medium of claim 21, wherein the one or more instructions further cause the UE to:
reduce one or more weights associated with the one or more antennas for the beam search.

24. The non-transitory computer-readable medium of claim 21, wherein the one or more instructions further cause the UE to:
skip one or more tracking opportunities associated with the one or more antennas based at least in part on the blockage.

25. The non-transitory computer-readable medium of claim 21, wherein the identification of the blockage is based at least in part on a signal from a blockage sensor of the UE.

26. An apparatus for wireless communication, comprising:
means for transmitting a monitoring signal associated with one or more antennas; and
means for performing a beam search using a decreased frequency of occurrence of tracking occasions for the one or more antennas based at least in part on an identification of a blockage associated with the one or more antennas, the identification being based at least in part on the monitoring signal, the decreased frequency of occurrence of tracking occasions for the one or more antennas being relative to a prior frequency of occurrence of tracking occasions for the one or more antennas.

27. The apparatus of claim 26, further comprising means for identifying a serving beam for the apparatus.

28. The apparatus of claim 26, further comprising:
means for reducing one or more weights associated with the one or more antennas for the beam search.

29. The apparatus of claim 26, further comprising:
means for skipping one or more tracking opportunities associated with the one or more antennas based at least in part on the blockage.

30. The apparatus of claim 26, wherein the identification of the blockage is based at least in part on a signal from a blockage sensor of the apparatus.

* * * * *